Oct. 1, 1929.                F. A. THESEN                1,730,253
                          COMBINATION BURNER
                            Filed June 2, 1928

Inventor
Frederick August Thesen.
By Adam E. Fisher.
Attorney

Patented Oct. 1, 1929

1,730,253

UNITED STATES PATENT OFFICE

FREDERICK AUGUST THESEN, OF QUINCY, ILLINOIS

COMBINATION BURNER

Application filed June 2, 1928. Serial No. 282,298.

This invention relates to a portable burner adapted for use as a heater and for cooking.

The main object is to provide such a device which will be simple and cheap in manufacture and efficient in its use either as a heater or as a cooker.

Another object is to provide a device which will be safe and economical in use and which may be used with any one of a variety of fuels for burning.

With these and other objects in view the invention resides in the novel construction and assembly of the elements as hereinafter set forth and claimed.

Figure 1:
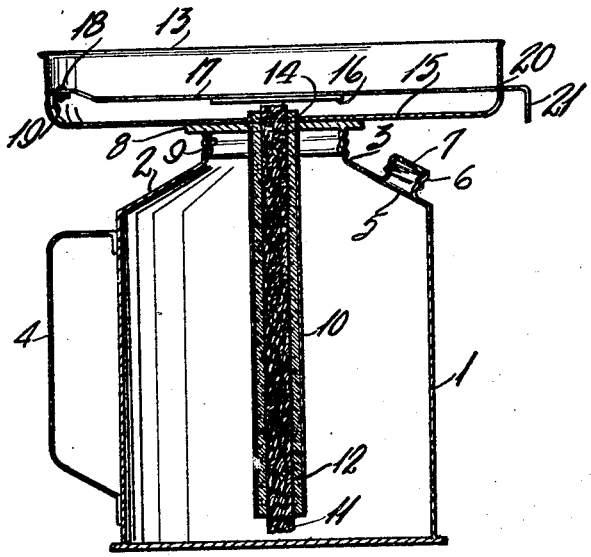
Figure 1 is a vertical section of a burner constructed in accordance with my invention.

In practicing my invention I provide a cylindrical container 1 having a converging top portion 2 with the threaded mouth 3. A handle 4 is attached to the side of the container 1 and an inlet opening 5 is provided with a removable cap 6 having an aperture 7 to admit air into the container 1.

The burner comprises a circular top plate 8 having an extended threaded portion 9 adapted to engage the threaded mouth 3 of the container 1. Affixed in and passing through the plate 8 is the elongated circular shell 10 in the nature of a wick tube, adapted to fit within the container 1 when the burner is put in place and terminating short of the bottom thereof as shown in Figure 1. A wick 11 of any suitable material is secured within the shell 10 by means of a suitable fire resisting cement filling 12, the said wick projecting outward at both ends as shown. It will be understood that, by placing a suitable volatile fuel such as denatured alcohol or benzine or the like in the container 1, the wick 11 will absorb the same in the usual manner by capillary attraction, so that the extended upper end of the wick will be constantly charged with constantly burning fuel. The device as so far recited may be used as a heater or as a lamp, and it is found in practice that a wick structure as described, using the sort of fuel specified, will last indefinitely.

Figure 2:
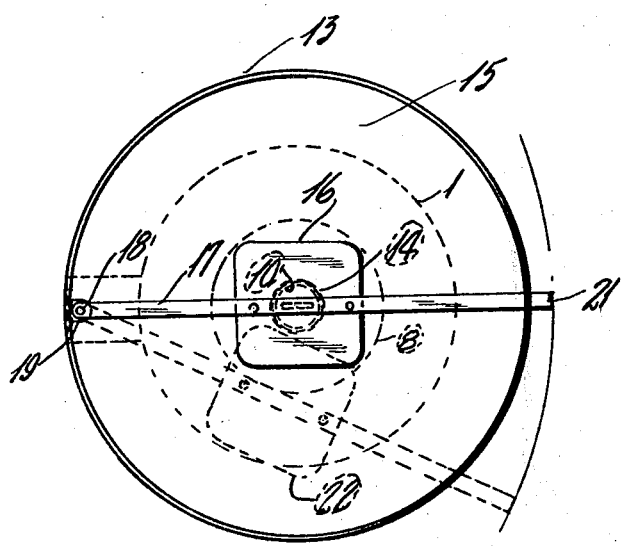
Figure 2 is a plan view thereof.

To facilitate the use of the device for cooking I provide a circular pan element 13 adapted to detachably seat upon the plate 8 by means of a medial aperture 14 in the base 15 of the said pan 13. It will thus be understood that a cooking utensil (not shown) may be seated upon the pan element 13 and the flame from the wick 11 will cook the contents thereof. To prevent soot from forming upon the bottom of the cooking utensil (not shown) I provide the square cover element 16 which is fastened to the strip 17, pivoted at 18 to a bracket 19 upon the side of the pan 13 and having its free end extended outward through the slot 20 in the opposite side of the pan 13 and having a handle 21. By this means the cover element 16 may be swung to one side as shown by the dotted lines 22 in Figure 2 when not in use. The said cover element also serves to spread the flame causing it to heat a greater portion of the cooking utensils bottom.

The circulation of cold air around the bottom of the pan 13 will conduct the heat away from the fuel container 1, greatly lessening the danger of explosion.

Figure 3:
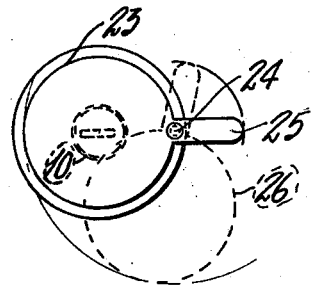
Figure 3 is a plan view of a modified burner.

In Figure 3 is shown a modification of the burner wherein the top plate 8 is provided with a circular snuffer 23, pivoted at 24 and having a handle 25. When the burner is not in use the snuffer 23 may rest over the tube or shell 10 and wick 11 as shown and when the burner is in use may be swung to one side as shown in the dotted lines 26.

Thus it will be evident that I provide a simple, cheap and efficient device having a great variety of uses.

While I have herein set forth a preferred embodiment of my invention, it is understood that I may vary from the same in minor details within the scope of the appended claim.

I claim:

In a device of the kind described, the combination of a fuel container, having a threaded mouth, a burner element threadedly engaging the said mouth, a wick tube extended through the said burner element down into the said container, the upper end of the tube projecting above the said burner element, a wick inserted through the said tube, a pan-like element supported above the said burner element, the said pan-like element having a central aperture for accommodating the upper end of the wick tube and having a slot formed through a flange thereof at one side, an arm passed through the said slot of the said flange diameterically across the said pan-like element, the end of the arm being pivotally connected with the flange of the pan-like element oppositely to the said slot, and a cover plate mounted upon the said arm and adapted to swing over the upper end of the said wick tube.

In testimony whereof I affix my signature.

FREDERICK AUGUST THESEN.